US011640281B2

(12) United States Patent
Rehman et al.

(10) Patent No.: US 11,640,281 B2
(45) Date of Patent: May 2, 2023

(54) TOOL FOR INTROSPECTION IN OBJECT-ORIENTED SOURCE CODE

(71) Applicant: INTERNATIONAL BUSINESS MACHINES CORPORATION, Armonk, NY (US)

(72) Inventors: Syed Ataur Rehman, Bangalore (IN); Shubha N Rao, Bengaluru (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/302,931

(22) Filed: May 17, 2021

(65) Prior Publication Data

US 2022/0365758 A1 Nov. 17, 2022

(51) Int. Cl.
*G06F 8/30* (2018.01)

(52) U.S. Cl.
CPC .................................. *G06F 8/315* (2013.01)

(58) Field of Classification Search
CPC ...................................................... G06F 8/315
USPC ......................................................... 717/116
See application file for complete search history.

(56) References Cited

U.S. PATENT DOCUMENTS

| | | | |
|---|---|---|---|
| 7,243,343 B2 | 7/2007 | Edwards | |
| 7,454,743 B2* | 11/2008 | Fuchs | G06F 9/44505 717/123 |
| 7,480,894 B2* | 1/2009 | Hasson | G06F 8/70 717/115 |
| 7,650,593 B2* | 1/2010 | Horton | G06F 11/3664 717/113 |
| 8,028,275 B2* | 9/2011 | Eldridge | G05B 15/02 717/121 |
| 10,038,592 B2* | 7/2018 | Guntaka | H04L 41/0813 |
| 2005/0055682 A1* | 3/2005 | Gadre | G06F 8/315 717/146 |
| 2006/0112399 A1 | 5/2006 | Lessly | |
| 2006/0143227 A1 | 6/2006 | Helm | |
| 2008/0134138 A1* | 6/2008 | Chamieh | G06F 8/315 717/105 |

(Continued)

FOREIGN PATENT DOCUMENTS

| | | | | |
|---|---|---|---|---|
| JP | H10116202 | * | 5/1998 | .......... G06F 9/4881 |
| WO | 2000077632 A1 | | 12/2000 | |

OTHER PUBLICATIONS

Title: Virtuoso: Narrowing the semantic gap in virtual machine introspection; author: B Dolan-Gavitt,; published on 2011.*

(Continued)

*Primary Examiner* — Chameli Das
(74) *Attorney, Agent, or Firm* — Anthony Curro (57) ABSTRACT

A computer-implemented method, computer system, and computer program product for introspection of classes within source code. A computing device receives access to object-oriented source code. The computing device parses the source code to determine one or more objects contained in the source code. The computing device determines one or more classes associated with the one or more objects. The computing device generates a class table including one or more class data points associated with the one or more determined classes. The computing device generates one or more source code methods to perform a class-level introspection based upon the generated class table.

19 Claims, 8 Drawing Sheets

(56) References Cited

U.S. PATENT DOCUMENTS

| | | | | |
|---|---|---|---|---|
| 2009/0077536 A1* | 3/2009 | Foti | ................... | G06F 9/4492 |
| | | | | 717/116 |
| 2014/0280370 A1* | 9/2014 | Oberle | ................. | G06F 16/289 |
| | | | | 707/803 |
| 2021/0286104 A1* | 9/2021 | Brown | .................... | G01V 9/02 |

OTHER PUBLICATIONS

Title: Using logic programming to recover c++ classes and methods from compiled executables author: EJ Schwartz published on 2018.*

Title: OpenJava: A class-based macro system for Java, author: M Tatsubori, et al, published on 1999.*

Mirrors: design principles for meta-level facilities of object-oriented programming languages, author: G Bracha, et al, published on 2004.*

Bendersky, "Dumping a C++ Object's Memory Layout With Clang," LLVM & Clang, Dec. 17, 2012, 3 pages, <https://eli.thegreenplace.net/tag/llvm-clang>.

Chiba, "Load-time Structural Reflection in Java," ECOOP 2000—Object-Oriented Programming, LNCS 1850, Springer Verlag, 2000, pp. 313-336, <https://dl.acm.org/doi/10.5555/646157.679856>.

Chuang, et al., "Non-intrusive object introspection in C++," Software—Practice and Experience, Softw. Pract. Exper. 2002; 32 pp. 191-207, (DOI: 10.1002/spe.429), <https://dl.acm.org/doi/10.5555/302163.302194>.

De Bayser et al., "A System for Runtime Type Introspection in C++," Springer.com, Retrieved from the Internet, accessed May 6, 2021, 5 pages, <https://link.springer.com/chapter/10.1007/978-3-642-33182-4_9>.

Garret.Ru, "Reflection for C++," garret.ru, Retrieved from the Internet, accessed May 6, 2021, 6 pages, <http://www.garret.ru/cppreflection/docs/reflect.html>.

Keesari, "Reflection in .net," c-sharpcorner.com, Apr. 1, 2019, 25 pages.

Mell et al., "The NIST Definition of Cloud Computing", National Institute of Standards and Technology, Special Publication 800-145, Sep. 2011, pp. 1-7.

* cited by examiner

CLASS_RECORD_TABLE_A for NodeA
(contains basic types)

| Member dataType | Class member name | Sizeof | Offsetof() |
|---|---|---|---|
| Char | A | 1 | 0 |
| Int | B | 4 | 1 |
| Float | C | 8 | 5 |

310 →

330 →
```
class NodeA
{
    Char A;
    Int  B;
    Float C;
}
```

CLASS_RECORD_TABLE_B for NodeB
(contains composed object)

| Member dataType | Class member name | Sizeof | Offsetof() |
|---|---|---|---|
| Char | A | 1 | 0 |
| Int | B | 4 | 1 |
| Float | C | 8 | 5 |
| Class | nodeAObj | 13 | 13 |

350 →

355 →

370 →
```
class NodeB
{
    Char A;
    Int  B;
    Float C;
    NodeA nodeAObj;
}
```

FIG. 3

PARSE_CLASS pseudo code

```
PARSE_CLASS(ClassName)
{
    foreach member in the ClassName {
        entry_in_class = read the entry Create a table named CLASS_RECORD_TABLE unique to the given class name(class_name).
        if (entry_in_class = another_CLASS && is_base (another_CLASS) {
            PARSE_CLASS(entry_in_class);
            addRefToClassRecordTable (entry_in_clas)
        }
        else if ( entry_in_class = another class ) {
            PARSE_CLASS(entry_in_class )
        } else {
            // get the field data type and field_name, field size and field offset and save
            // it as a record in CLASS_RECORD_TABLE
            field_name - can get it while parsing.

field_data_type - can get it while parsing
            field_size = sizeof (field_data_type) ;
            field_offset = field_size + padding_if_any
            create a record in CLASS_RECORD_TABLE with these fileds { dta_type, field_name , field_size, field_offset }
            class_table_offset += size of class_table_entry_offset
        }
    }

Finally Save this table(CLASS_RECORD_TABLE ) in the object File
    Add mapping for class name to location of the class record table to CLASS_RECORD_INDEX_TABLE.
}
```

FIG. 4

INTROSPECT_CLASS – pseudo code

//This queries CLASS_RECORD_TABLE for the given class instance.

```
#define FIRST_ATTRIBUTE -1
#define END_OF_RECORD_TABLE=-2
INTROSPECT_CLASS(instance address )
{
    class_name = typeid(instance_address)
    class_record_table = LOOKUP_index_table(class_name) ;
    class_record_entry_itr = initialize to CLASS_RECORD_TABLE begin
    while (class_record_entry_itr != END_OF_RECORD_TABLE) {
        record_table_entry = value at class_record_entry_itr
        if (class_record_entry_itr->member_data_type == CLASS) {
            class_record_entry_itr->name->INTROSPECT_CLASS(implicit_instance_address);
        }
        attribute_value = fetch_from_memory(instance_address+ class_record_entry->offset , class_record_entry->size );
        display record_table_entry->name and attribute value
        class_record_entry_itr-> next()
    }
}
```

TOOL FOR INTROSPECTION IN OBJECT-ORIENTED SOURCE CODE

FIELD OF THE INVENTION

The present invention is directed towards the field of tools for software developers, and more specifically to a tool for introspection of objects and classes in a corpus of object-oriented source code.

BACKGROUND

The present embodiments relate to introspection of classes within a corpus of source code. A majority of modern object-oriented computer programming languages do not include an integrated introspection capability for classes and/or methods written in object-oriented source code. Software applications at present may contain more than a million lines of object-oriented source code, and since these large applications correspondingly contain a very high number of classes and objects, it would be very difficult for a human to understand all of these classes and objects on any sort of realistic timeframe. As class hierarchies continue to increase in complexity, this task becomes increasingly difficult, the task may become even more tedious or simply impossible. On the other hand, if a developer, project manager, etc. desires to use an introspection feature to understand classes and methods, he or she should would have to develop this feature him- or herself, and implement new methods to perform the task, which would further increase development time.

In response to this, a need is presented for a tool for introspection of object-oriented source code, to provide for an automated introspection capability of classes and/or methods within object-oriented source code by automatically generating a method within the source code to perform this introspection.

SUMMARY

Embodiments include a system, a computer program product, and a method for introspection of classes within a corpus of object-oriented source code. A computing device receives access to a corpus of object-oriented source code for introspection, the corpus of source code containing one or more objects associated with one or more classes. The computing device parses the corpus of object-oriented source code to determine one or more objects contained in the corpus. The computing device determines one or more classes associated with the one or more objects. The computing device generates a class table including one or more class data points associated with the one or more determined classes. The computing device then generates one or more source code methods to perform a class-level introspection based upon the generated class table.

These and other features and advantages will become apparent from the following detailed description of the exemplary embodiment(s), taken in conjunction with the accompanying drawings.

BRIEF DESCRIPTION OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

In response to this, the inventors propose a new invention to provide an introspection capability and functionality for classes within a corpus of object-oriented source code. The invention, in various embodiments, receives and analyzes a corpus of object-oriented source code for introspection of classes and/or methods contained within. As would be understood by one of skill in the art, object-oriented source code contains one or more objects associated with one or more classes. The computing device automatically parses a corpus of source code to discover the one or more objects contained in the source code, such as by, in an embodiment of the invention, collecting metadata associated with the one or more classes as "class data points" including one or more of a class name, one or more member names, data type, a size of a member, and an offset of the member in the classes. The computing device then generates a class table including the class data points associated with the one determined classes. The computing device then generates a source code method to perform a class-level introspection based upon the generated class table. Within the context of the present invention, this occurs in an automated fashion, without the need for developers to individually understand and introspect methods and classes of the source code in an automated fashion.

It will be readily understood that the components of the present embodiments, as generally described and illustrated in the Figures herein, may be arranged and designed in a wide variety of different configurations. Thus, the following detailed description of present embodiments of the invention is not intended to limit the scope of the embodiments, as claimed, but is merely representative of selected embodiments. It should be understood that the various embodiments may be combined with one another and that any one embodiment may be used to modify another embodiment.

References throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

As shown and described herein, a technical solution to the technical problem of a need for automated introspection of classes within a corpus of object-oriented source code is provided by developing the system, computer program product, method, and other aspects described and/or illustrated herein.

Figure 1:
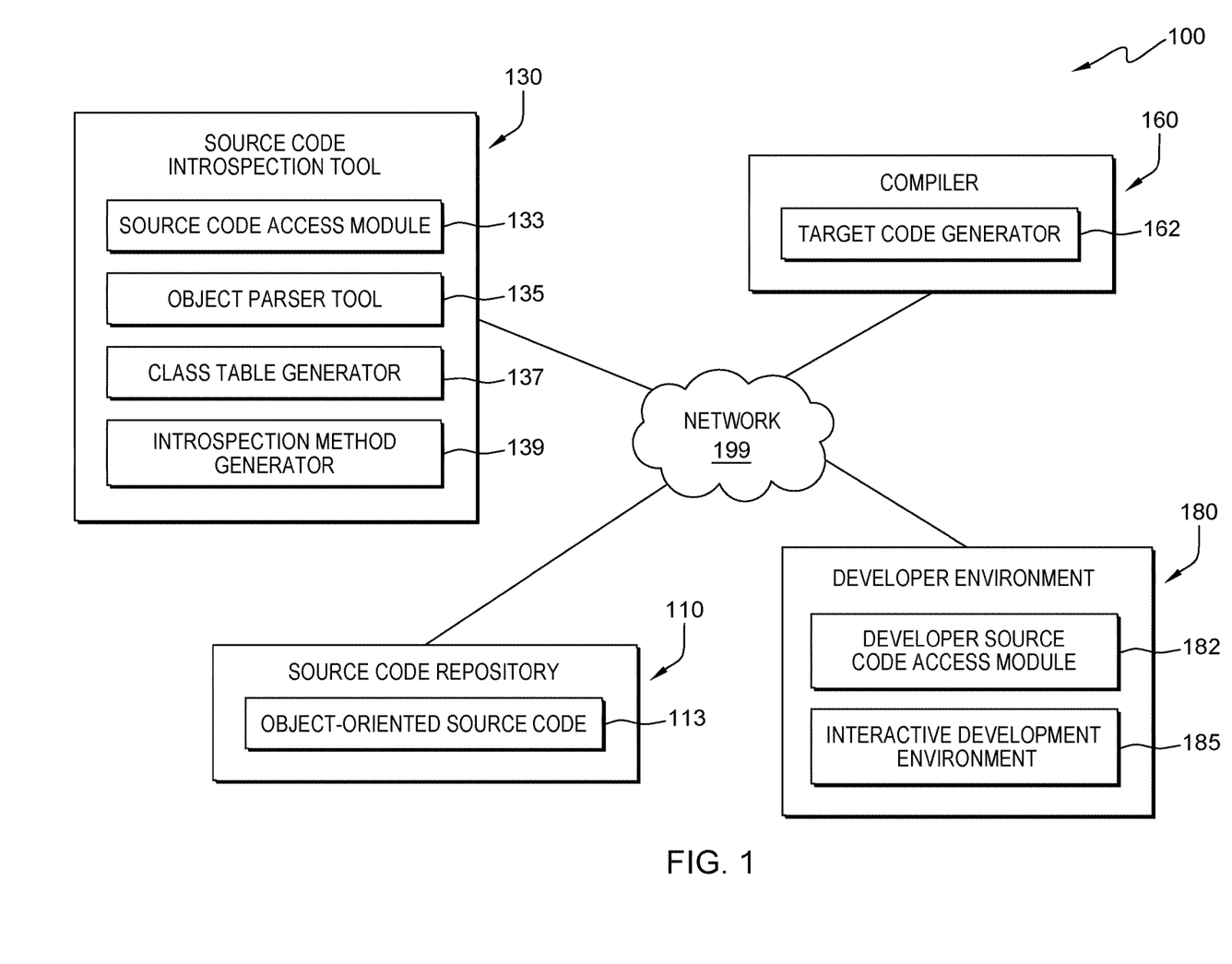
FIG. 1 depicts a system diagram illustrating a schematic diagram of a system 100 for introspection of classes within object-oriented source code, in accordance with an embodiment of the invention.

Referring to FIG. 1, a schematic diagram of a system 100 for introspection of classes within object-oriented source code is depicted. As shown, source code repository 110 is in functional communication with source code introspection tool 130, compiler 160, as well as developer environment 180. Source code repository 110 repository represents software and/or hardware for maintaining, storing, making available for compilation, etc. a corpus of object-oriented source code 113, which may include, in various embodiments of the invention, C++, Java (Oracle, Java, and MySQL are registered trademarks of Oracle and/or its affiliates. Other names may be trademarks of their respective owners.), or any other compiled, object-oriented source code written in any programming language. In other embodiments of the invention, other object-oriented programming languages are stored in source code repository 110, such as an interpreted (vs. compiled) object-oriented programming languages. Since source code 113 in source code repository 110 is written in an object-oriented program language, the source code contained contains one or more "objects," which are instances of "classes." Source code introspection tool 130 represents a developer tool to introspect object-oriented source code 113 maintained within source code repository 110, and perform various functionality as described herein including, in a preferred embodiment, to automatically generate and add to various classes within the corpus of source code a source code method to perform a class-level introspection. In various embodiments of the invention, source code introspection tool 130 is implemented as an integrated element of compiler 160 and/or developer environment 180, a plug-in to a compiler 160 and/or a developer environment 180, integrated in some other way, implemented as one or more objects implemented in source code, as an independently functioning application, or in another, equivalent manner.

Compiler 160 as depicted in system 100 represents software and/or hardware for compiling of source code in source code repository 110 into one or more different computer-readable forms (such as bytecode, assembly, object code, etc.) in creating an executable program (or a portion of an executable program), or performing some other transformation of source code. Developer environment 180, as depicted in FIG. 1 represents software and/or hardware for a developer to access and utilize an integrated development environment, command line, source code editor, or the like for viewing, modifying, editing, requestion compilation, or performing other functionality associated with source code repository 110, as well as access functionality associated with the presently disclosed invention. All of source code repository 110, source code introspection tool 130, compiler 160, and developer environment 180 are connected via network 199 (which, in various embodiments, may be replaced with a bus structure, on one or more distinct computing devices, a communications fabric, etc.). One or more of source code repository 110, source code introspection tool 130, compiler 160, and developer environment 180 may be integrated in one tool, application, etc., as further discussed herein. Contemplated specifically is an integration of source code introspection tool 130, compiler 160, and developer environment 180.

Source code repository 110, as further described herein, represents software and/or hardware for storing, maintaining, making available for editing, making available for compiling, etc. a corpus of object-oriented source code 113. In a preferred embodiment of the invention, source code stored in source code repository 110 is compiled before execution, but in other embodiments the source code may be interpreted during execution. Source code repository 110 may limit access to source code 113 to certain users, to maintain confidentiality and prevent unwanted external disclosures of the source code 113. The corpus of source code 113 contained in source code repository 110 may be very large (containing tens of thousands or more lines of code), and contain also a large number of objects for introspection in connection with the presently disclosed invention. In embodiments of the invention, source code repository 110 is integrated with one or more of source code introspection tool 130, compiler 160, and/or developer environment 180.

Source code introspection tool 130 represents a developer tool for performing introspection of classes within a corpus of source code 113, in an embodiment of the invention. In various embodiments of the invention (as further discussed herein), source code introspection tool 130 is integrated with compiler 160 and/or developer environment 180, such as in a plug-in to compiler 160 or developer environment 180. Source code access module 133 of source code introspection tool 130 receives access to a corpus of object-oriented source code 113 from source code repository 110. As further discussed herein, the corpus of object-oriented source code 113 contains one or more "objects," which, as one of skill in the art would understand, are instances of "classes" available within the corpus of object-oriented source code 113. Object parser tool 135 of source code introspection tool 130 automatically parses the one or more objects within the corpus of source code 113, to determine which classes are associated with the one or more objects in the corpus of object-oriented source code 113. Pseudocode which may be used by source code introspection tool 130 is displayed in connection with FIG. 4 and associated text (in practice, as one of skill in the art would understand pseudocode would be implemented as traditional source code). In a further embodiment of the invention, object parser tool 135 inspects if the one or more classes contain only basic type members, and if so, execution terminates. The associated classes found by the object parser tool 135 are stored for further use, as discussed herein.

Also as is displayed in connection with FIG. 1, class table generator 137 then, in an embodiment of the invention, generates a class table which includes one or more class data points associated with the one or more determined classes. Sample class tables and associated class data points, in embodiments of the invention, are included as FIG. 3, and further discussed below. Pseudocode which may be used by class table generator 137 is displayed in connection with FIG. 4 and associated text (in practice, as one of skill in the art would understand pseudocode would be implemented as traditional source code, in an embodiment of the invention). In various embodiments of the invention, class table generator 137 collects metadata from the one or more determined classes, and uses the collected metadata in generating the class table. The collected metadata may include, for example, the member name, the data type, a size and offset of class members. In case where the class members are of the "class type," the type maintained in the metadata is "class." The collected metadata may be referred to as "class data points" herein.

Introspection method generator 139, in various embodiments of the invention, then generates one or more source code methods for performing a class-level introspection based upon the generated class table. The term "source code methods" is included herein to clarify that the one or more source code methods generated by introspection method generator 139 are, as one of skill the art would understand, one or more actions which an object in a corpus of source code is able to perform, versus a "computer-implemented method" performed in an embodiment of the invention. In an embodiment of the invention, source code methods generated by introspection method generator 139 are appended to one or more objects/classes in the corpus of object-oriented code, for further use by a developer, project manager, etc. In an embodiment of the invention, source code methods generated by introspection method generator 139 are generated during compilation of the corpus of object-oriented source code.

The source code methods generated by introspection method generator 139 may have various applications, including for structural analysis of classes, dynamic manipulation of program behavior, binding user interfaces to background data objects, serialization, debugging (with the advantage of viewing of structural analysis of classes, for example, during debugging), and logging frameworks.

Still referring to FIG. 1, also displayed is compiler 160. Compiler 160 represents software and/or hardware for compilation of object-oriented source code 113 in source code repository 110 into one or more different computer-readable forms (such as, by means of non-limiting example, bytecode, assembly, object code, etc.), in creating an executable program (or a portion of an executable program), or converting source code into another computer usable form. Software associated with target code generator 162 performs the compilation of object-oriented source code 113. In various embodiments of the invention, one or more of source code repository 110, source code introspection tool 130, and/or developer environment 180 are integrated with compiler 160, such as via one or more software plug-in(s) to compiler 160, integrated applications, or another equivalent means.

Finally, with regard to FIG. 1, developer environment 180 is displayed. Developer environment 180 represents software and/or hardware for a developer or other user to access object-oriented source code 113, for the purposes of viewing, modifying, editing, requestion compilation, or performing other functionality associated with source code repository 110, as well as access functionality associated with the presently disclosed invention. In various environments of the invention, developer environment 180 may be a command-line editor, traditional interactive development environment, etc. Object-oriented source code 113 is accessed from source code repository 110 via a developer source code access module 182. A developer or other user utilizes interactive development environment 185 to view, access, edit, modify, etc. source code 113. Developer using interactive development environment 185 may also request compilation of source code 113 by compiler 160. In various embodiments of the invention, developer environment 180 may be integrated with one or more of source code repository 110, source code introspection tool 130, and/or compiler 160. In connection with embodiments of the invention, a developer utilizing developer environment 180 can request an introspection of one or more classes within the corpus of object-oriented source code. In a preferred embodiment of the invention, developer environment 180 is integrated with source code introspection tool 130 and/or compiler 160. The introspection (and functionality associated with the presently disclosed invention) is then performed with software associated with interactive developer environment 185.

Figure 2:
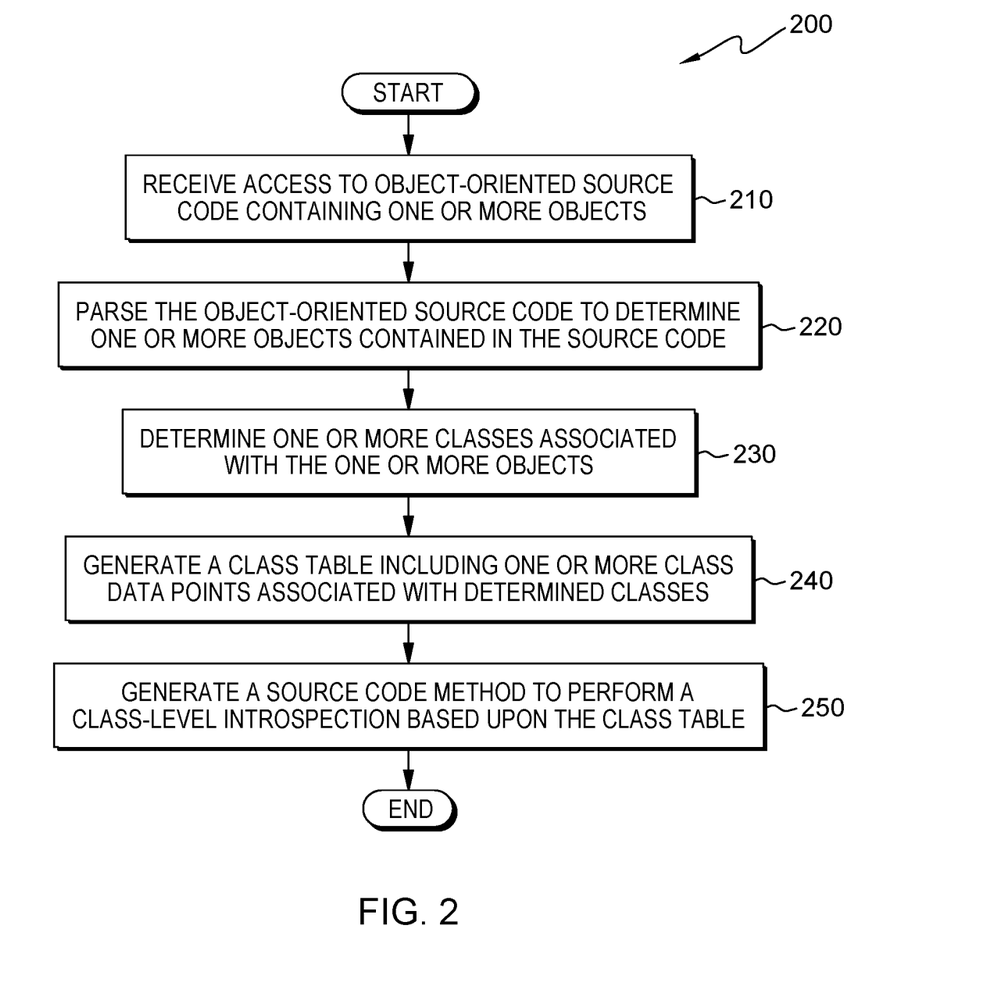
FIG. 2 depicts a flow chart illustrating an embodiment of the invention for introspection of classes within object-oriented source code, in accordance with an embodiment of the invention.

Referring to FIG. 2, to improve understanding of selected embodiments of the presently disclosed invention, shown is a flowchart 200 displaying introspection of classers within a corpus of object-oriented source code. At step 210, access is received by source code introspection tool 130 to a corpus of source code 113 residing in source code repository 110. The corpus of source code 113 residing in source code repository 110 contains one or more objects. At step 220, source code introspection tool 130 parses the object-oriented source code 110 to determine one or more objects contained in the corpus of source code 110. At step 230, source code introspection tool 130 determines one or more classes associated with the one or more objects. At step 240, source code introspection tool 130 generates a class table including one or more class data points associated with the determined classes. A sample class table is displayed in FIG. 3. Pseudocode which may be used in connection with source code introspection tool 130 to generate a class table is displayed in connection with FIG. 4. At step 250, source code introspection tool 130 generates a source code method to perform a class-level introspection, the class-level introspection based upon the class table. Pseudocode which may be used in connection with source code introspection tool 130 is displayed in connection with FIG. 5. Further details on this process associated with selected embodiments are provided elsewhere herein.

Figure 3:
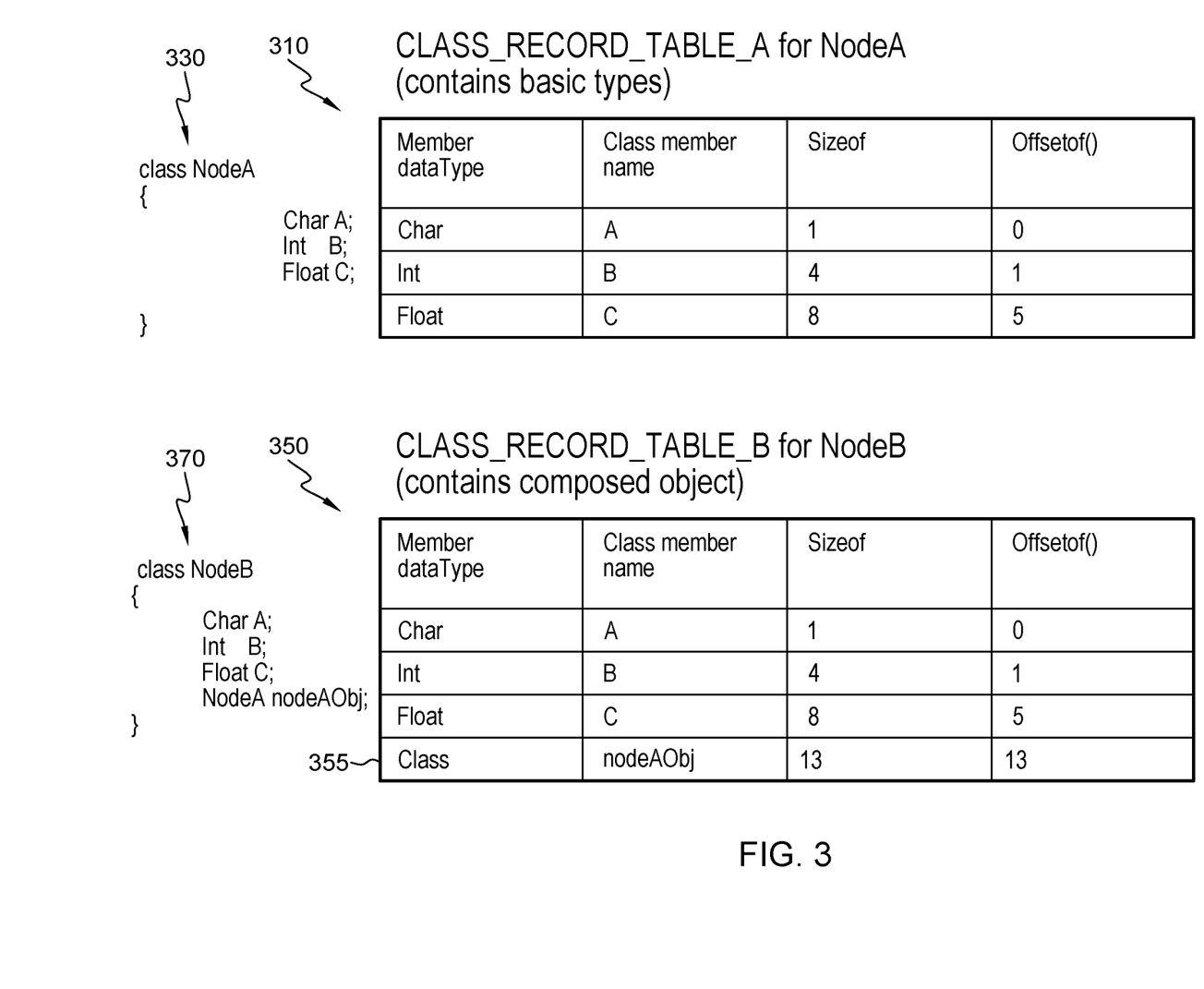
FIG. 3 depicts two sample class record table, in accordance with an embodiment of the invention.

Referring to FIG. 3, displayed are two sample class tables 310, 350, such as generated by source code introspection tool 130, in an embodiment of the invention. The first class table displayed, "Class_Record_Table A" 310 contains only basic types, such as extracted from a class entitled NodeA 330 containing only basic type members. In an embodiment of the invention, source code introspection tool 130 generates class record table 310 from class NodeA 330. The basic types contained within class NodeA 330 include, as one of skill would understand, Char A, Int B, and Float C. These basic types indicate what type of data is stored in variables A, B, and C, such as used in connection with programming languages C and C++. "Basic types" may also be referred to as "primitive built-in types" or "primitives" in C++. As is understood by one of skill in the art, "Char A" represents a variable to store a character, named "A" being of size 1 byte, having an offset of 0. "Int B" represents a variable named "B" to store an integer, and is 4 bytes in size, having an offset of 1. "Float C" represents a variable named "C" holding a floating point decimal number, and is 8 bytes in size, having an offset of 5. NodeA 330 contains only "basic types," as discussed herein, and in an embodiment of the invention, execution of an embodiment of the invention ends if only basic types are detected in one or more objects, as discussed further herein. In various embodiments of the invention, Class_Record_Table_A 310 is stored to an object file for further utilization, in connection with the presently disclosed invention.

Also shown in FIG. 3 is a second class table, "Class_Record_Table_B" 350, which contains basic data types as well as a class type, composed object, Class nodeAObj. Class_ record_table_B 350 was generated from class NodeB 370, and contains basic data types Char A, Int B, and Float C, as well as (nested) class NodeAObj of type NodeA. Char A is of size 1 byte, with an offset of 0, Int B is of size 4 bytes, with an offset of 1, Float C is of size 8 bytes, with an offset of 5. Class NodeAObj is of size 13 bytes (as shown above 310), with an offset of 13. Source code introspection tool 130, in an embodiment of the invention, performs an introspection based upon Class_Record_Table_B 350, in developing source code methods, as further discussed herein. Class_Record_Table_B may be stored to an object file for further utilization, in connection with the presently disclosed invention. In an embodiment of the invention, introspection method generator 139 may write a new member function to inspect nested class NodeAObj.

Figure 4:
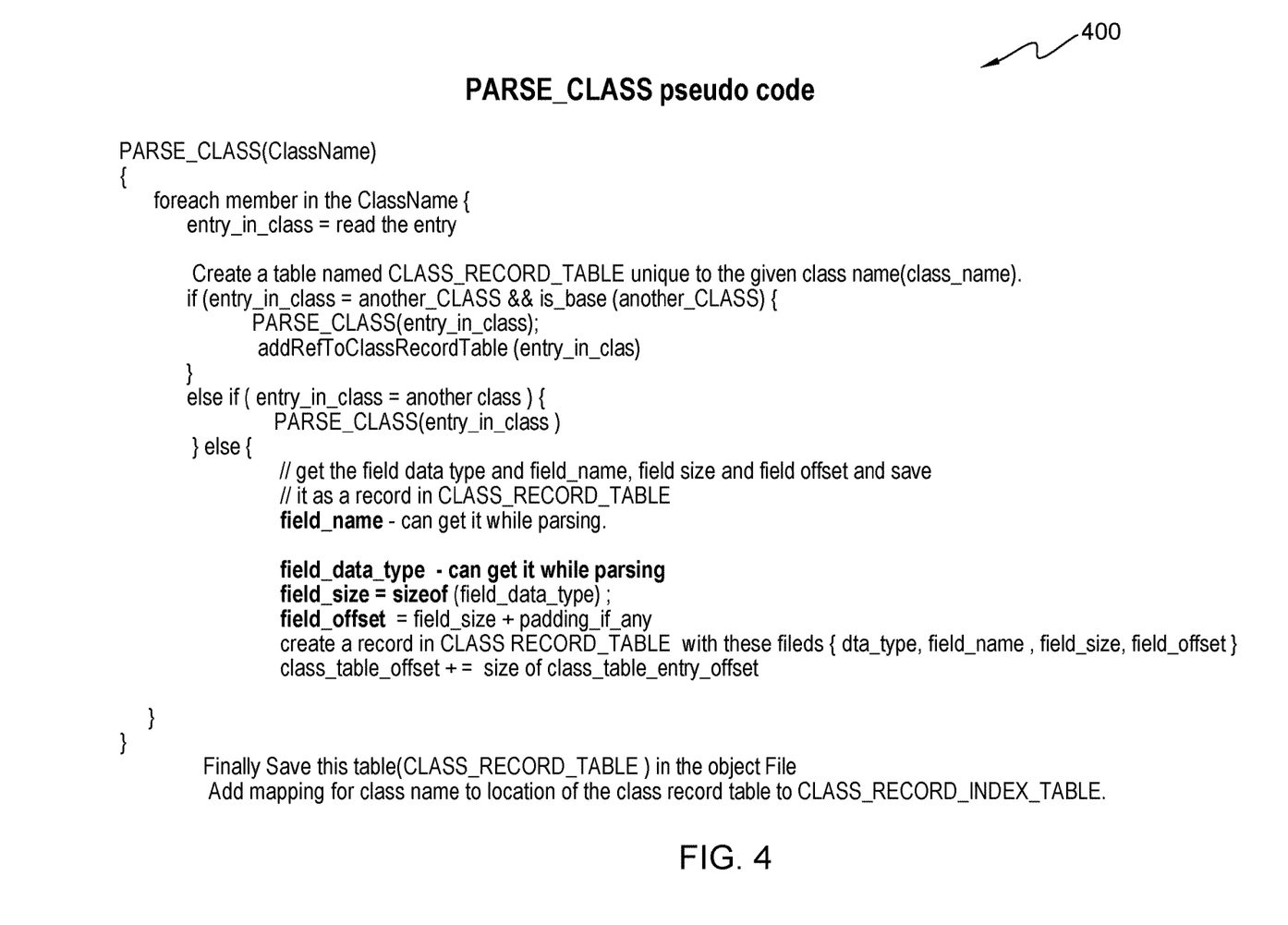
FIG. 4 depicts pseudocode for execution of a PARSE_CLASS computer-implemented method, in accordance with an embodiment of the invention.

Referring now to FIG. 4, displayed is pseudocode for execution of a PARSE_CLASS 400 computer-implemented method, in connection with one or more embodiments of the invention. Pseudocode for the PARSE_CLASS 400 (such as executed by source code introspection tool 130) serves to generate a class table, for further utilization in connection with the presently disclosed invention, as discussed herein. As would be understood by one of skill in the art, a developer reviewing pseudocode for PARSE_CLASS 400 would be able to develop a corresponding program in C++ (or another compiled, object-oriented programming language), to perform this function. Pseudocode contained within PARSE_CLASS 400 may be changed without departing from the scope of the invention.

Figure 5:
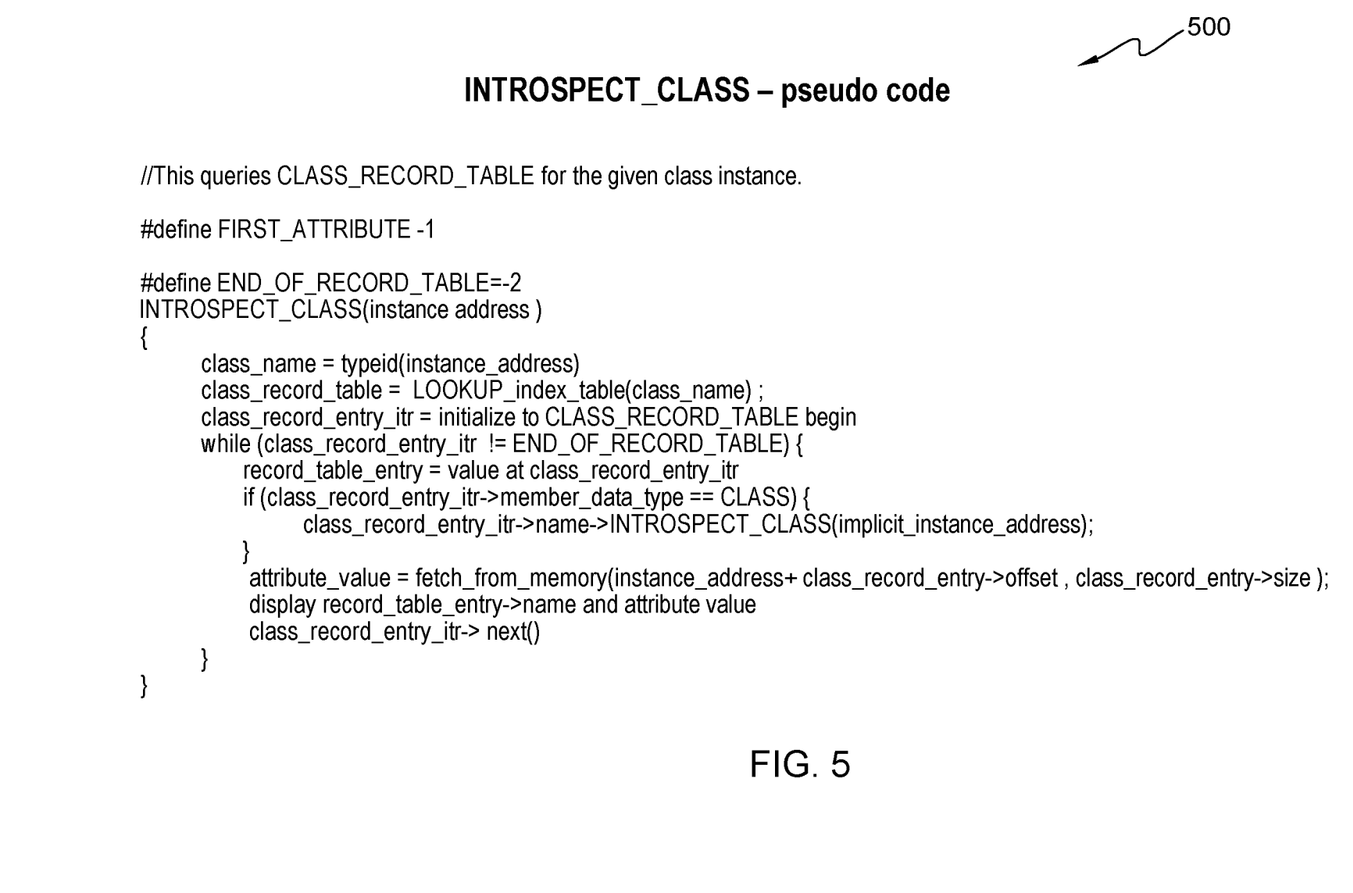
FIG. 5 depicts pseudocode for execution of an INTROSPECT_CLASS computer-implemented method, in accordance with an embodiment of the invention.

Referring now to FIG. 5, displayed is pseudocode for execution of an INTROSPECT_CLASS 500 computer-implemented method, in connection with one or more embodiments of the invention. Pseudocode for INTROSPECT_CLASS 500 (such as would be executed by source code introspection tool 130) serves to perform a class-level introspection, based upon the generated class table (such as generated above, in connection with pseudocode described in FIG. 4). Again, as would be understood by one of skill in the art, a developer reviewing pseudocode 500 would be able to develop a corresponding program in C++ (or another compiled, object-oriented programing language), to perform this function. Pseudocode contained with INTROSPECT_CLASS 500 may be changed without departing from the scope of the invention.

Figure 6:
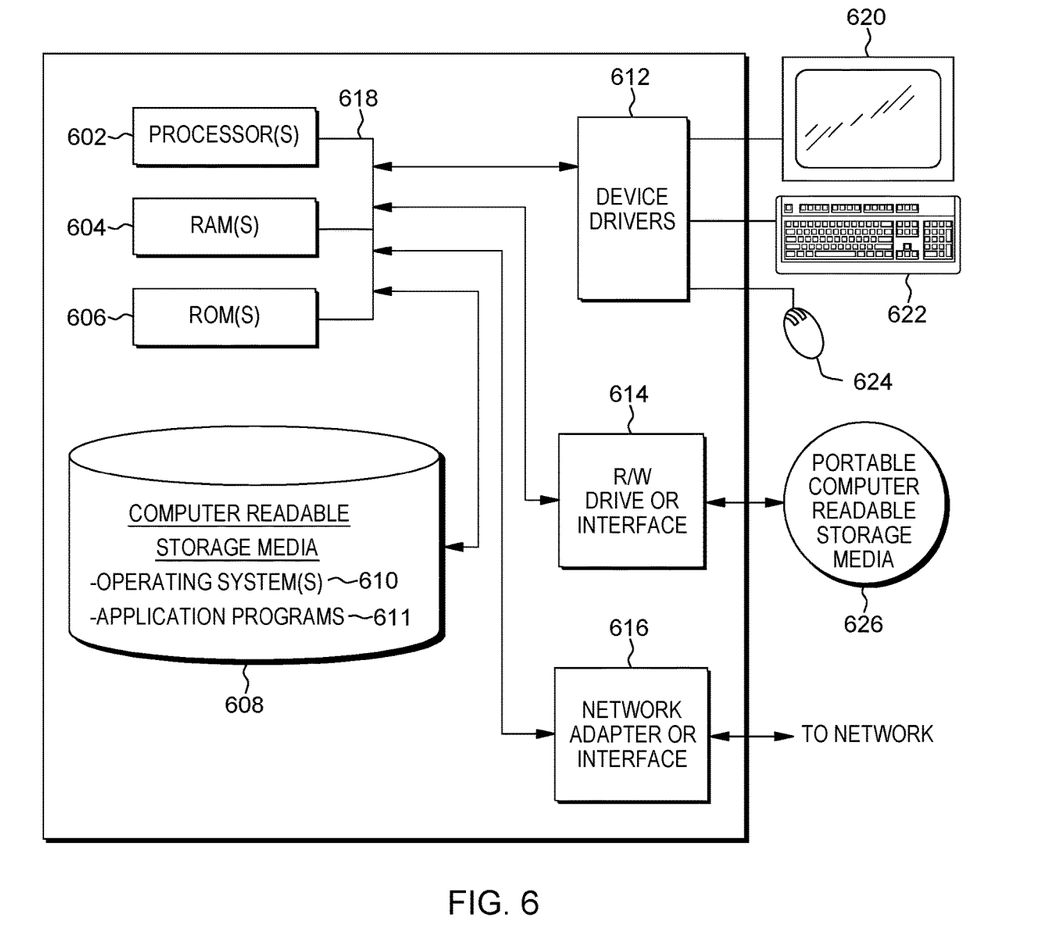
FIG. 6 depicts a block diagram illustrating components of source code repository 110, source code introspection tool 130, compiler 160, and developer environment 180 of FIG. 1, in accordance with an embodiment of the invention.

FIG. 6 depicts a block diagram of components of source code repository 110, source code introspection tool 130, compiler 180, and developer environment 180, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Source code repository 110, source code introspection tool 130, compiler 180, and developer environment 180 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, system 100 for introspection of classes within object-oriented source code, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Source code repository 110, source code introspection tool 130, compiler 180, and developer environment 180 may also include a R/W drive or interface 914 to read from and write to one or more portable computer readable storage media 926. Application programs 911 may be stored on one or more of the portable computer readable storage media 926, read via the respective R/W drive or interface 914 and loaded into the respective computer readable storage media 908.

Source code repository 110, source code introspection tool 130, compiler 180, and developer environment 180 may also include a network adapter or interface 916, such as a TCP/IP adapter card or wireless communication adapter (such as a 4G wireless communication adapter using OFDMA technology). Application programs 911 executing on source code repository 110, source code introspection tool 130, compiler 180, and developer environment 180 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Source code repository 110, source code introspection tool 130, compiler 180, and developer environment 180 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a computer-implemented method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of computer-implemented methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of computer-implemented method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
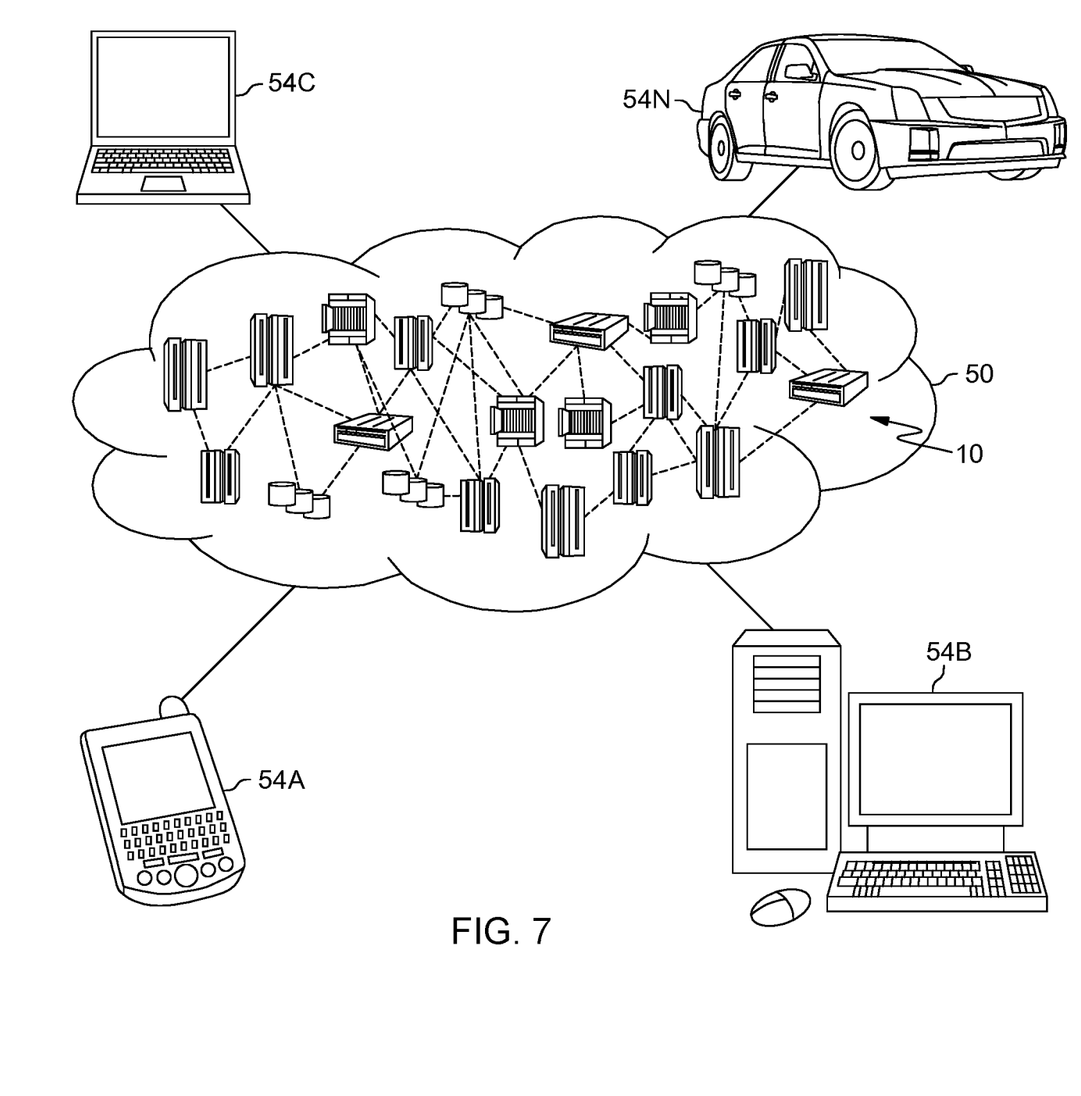
FIG. 7 depicts a cloud-computing environment, in accordance with an embodiment of the invention

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 8:
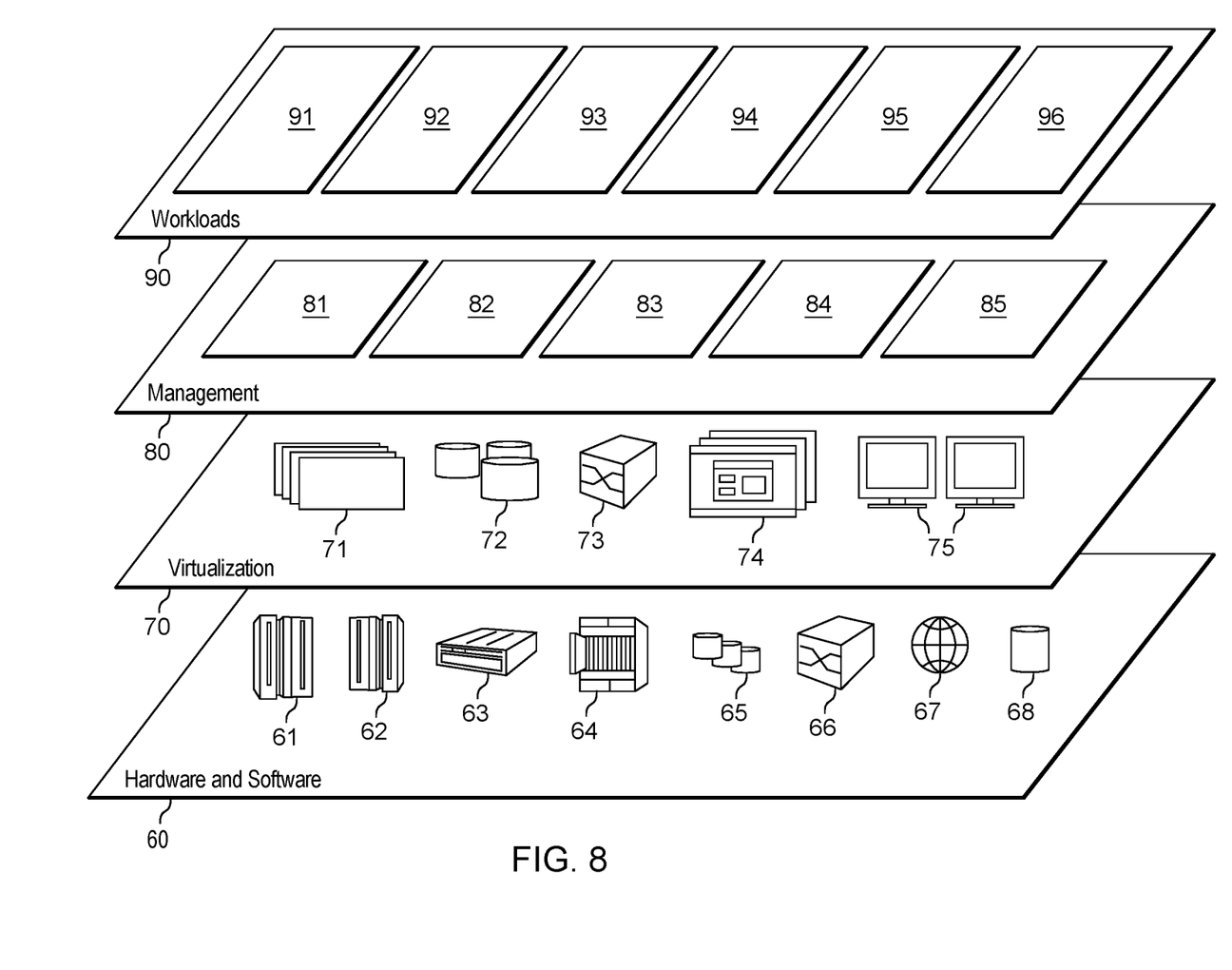
FIG. 8 depicts abstraction model layers, in accordance with an embodiment of the invention.

Referring now to FIG. 8 a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Based on the foregoing, a computer-implemented method, system, and computer program product have been disclosed. However, numerous modifications and substitutions can be made without deviating from the scope of the present invention. Therefore, the present invention has been disclosed by way of example and not limitation.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer-implemented method for introspection of classes within a corpus of object-oriented source code, the method comprising:
   receiving by a computing device access to a corpus of object-oriented source code for introspection, the corpus of source code containing one or more objects associated with one or more classes;
   parsing by the computing device the corpus of object-oriented source code to determine one or more objects contained in the corpus;
   determining by the computing device one or more classes associated with the one or more objects;
   generating by the computing device a class table including one or more class data points associated with the one or more determined classes; and
   generating by the computing device one or more source code methods to perform a class-level introspection based upon the generated class table,
   wherein if the one or generated source code methods, after inspecting every member of the one or more classes, encounter one or more nested classes of another class type, the computing device writes a new member function for inspecting the one or more nested classes, the new member function inspecting every member of the one or more nested classes.

2. The computer-implemented of claim 1, wherein the one or more source code methods to perform the class-level introspection are generated during compilation of the corpus of object-oriented source code.

3. The computer-implemented method of claim 2, wherein during compilation the computing device collects metadata from the one or more classes and uses the collected metadata in generating the class table.

4. The computer-implemented method of claim 3, wherein the collected metadata includes selectively one or more of a class name, a data type, a size of a member, and an offset of a member.

5. The computer-implemented method of claim 2, wherein the introspection occurs within an interactive development environment.

6. The computer-implemented method of claim 1, wherein the object-oriented source code is C++.

7. The computer-implemented method of claim 1, wherein the object-oriented source code is written in a compiled object-oriented programming language.

8. The computer-implemented method of claim 1, wherein the one or more class data points in the generated class table include selectively one or more of the following: a class name, one or more member names, one or more member data types, a size, and an offset based on member sizes.

9. The computer-implemented method of claim 1, further comprising before generating by the computing device the class table, inspecting whether the one or more classes contain basic type members and, if so, execution terminates.

10. A computer system for introspection of classes within a corpus of object-oriented source code, the method comprising:
    one or more computer processors;
    one or more non-transitory computer-readable storage media;
    program instructions stored on the non-transitory computer-readable storage media for execution by at least one of the one or more processors, the program instructions comprising:
    program instructions to receive by a computing device access to a corpus of object-oriented source code for introspection, the corpus of source code containing one or more objects associated with one or more classes;
    program instructions to parse by the computing device the corpus of object-oriented source code to determine one or more objects contained in the corpus;
    program instructions to determine by the computing device one or more classes associated with the one or more objects;
    program instructions to generate by the computing device a class table including one or more class data points associated with the one or more determined classes; and
    program instructions to generate by the computing device one or more source code methods to perform a class-level introspection based upon the generated class table,
    wherein the if the generated one or more source code methods, after inspecting every member of the one or more classes, encounter one or more nested classes of another class type, the computing device writes a new member function for inspecting the one or more nested classes, the new member function inspecting every member of the one or more nest classes.

11. The computer system of claim 10, wherein the one or more source code methods to perform the class-level introspection are generated during compilation of the corpus of object-oriented source code.

12. The computer system of claim 11, wherein during compilation the computing device collects metadata from the one or more classes and uses the collected metadata in generating the class table.

13. The computer system of claim 11, wherein the introspection occurs within an interactive development environment.

14. The computer system of claim 10, wherein the object-oriented source code is written in a compiled object-oriented programming language.

15. A computer program product for introspection of classes within a corpus of object-oriented source code, the computer program product comprising:
one or more non-transitory computer-readable storage media and program instructions stored on the one or more non-transitory computer-readable storage media, the program instructions, when executed by the computing device, cause the computing device to perform a method comprising:
receiving by a computing device access to a corpus of object-oriented source code for introspection, the corpus of source code containing one or more objects associated with one or more classes;
parsing by the computing device the corpus of object-oriented source code to determine one or more objects contained in the corpus;
determining by the computing device one or more classes associated with the one or more objects;
generating by the computing device a class table including one or more class data points associated with the one or more determined classes; and
generating by the computing device one or more source code methods to perform a class-level introspection based upon the generated class table,
wherein if the one or generated source code methods, after inspecting every member of the one or more classes, encounter one or more nested classes of another class type, the computing device writes a new member function for inspecting the one or more nested classes, the new member function inspecting every member of the one or more nested classes.

16. The computer program product of claim 15, wherein the one or more source code methods to perform the class-level introspection are generated during compilation of the corpus of object-oriented source code.

17. The computer program product of claim 16, wherein during compilation the computing device collects metadata from the one or more classes and uses the collected metadata in generating the class table.

18. The computer program product of claim 15, wherein the introspection occurs within an interactive development environment.

19. The computer program product of claim 15, wherein object-oriented source code is written in a compiled object-oriented programming language.

* * * * *